United States Patent [19]

Litt et al.

[11] Patent Number: 4,510,392

[45] Date of Patent: Apr. 9, 1985

[54] AUTORADIOGRAM MARKING PROCESS

[75] Inventors: Gerald J. Litt; Lloyd C. Litt, both of Wellesley, Mass.

[73] Assignee: E. I. Du Pont de Nemours and Company, Wilmington, Del.

[21] Appl. No.: 483,127

[22] Filed: Apr. 8, 1983

[51] Int. Cl.³ .............................................. G01T 1/08
[52] U.S. Cl. ................................ 250/475.2; 250/303; 378/62; 378/162
[58] Field of Search ............... 250/475.2, 303; 378/62, 378/162

[56] References Cited

U.S. PATENT DOCUMENTS

| | | | |
|---|---|---|---|
| 2,396,219 | 3/1946 | Weagle | 252/301.4 |
| 3,631,243 | 12/1971 | Byler | 250/67 |
| 4,293,436 | 10/1981 | Fost | 250/303 |

FOREIGN PATENT DOCUMENTS 14436 8/1980 European Pat. Off. .
56493 8/1975 Switzerland .

*Primary Examiner*—Alfred E. Smith
*Assistant Examiner*—Jack I. Berman

[57] ABSTRACT

A process of forming indicia on autoradiograms is disclosed wherein a substrate containing a distribution of radioactive material, such as radioactively tagged proteins, is marked with a hexagonal Wurtzite form of zinc sulfide doped with trace metals phosphor. The thusly marked substrate is exposed to actinic radiation to charge the phosphor. The substrate is then superposed on an X-ray film to form a latent photographic image in the film which is developed by conventional means to form a photographic image of the phosphorescent indicia and the distribution of radioactive material in the substrate.

4 Claims, No Drawings

AUTORADIOGRAM MARKING PROCESS

BACKGROUND OF THE INVENTION

1. Field of the Invention

In a number of scientific disciplines, radioactive materials are detected by autoradiography, a process wherein the substrate is placed in superposition over a piece of X-ray film and the radiation "exposes" the silver halide. Sometimes this is enhanced by using a phosphor screen behind the film. Sometimes it is done at low temperature to increase sensitivity.

A common need is a means of marking the substrate in order for the researcher to be able to clearly identify his system and, very importantly, to facilitate proper match up of the areas on the substrate with their corresponding exposed areas on the film.

Most research laboratories achieve this by preparing some sort of radioactive marker; these usually take the form of a colored ink to which is added appropriate amounts of outdated radiolabeled materials. Application is often by adaptation of commercial pens or simple dotting devices.

The disadvantages of this are many including:
1. Leakage can lead to general, although low level contamination.
2. Multiple pens must be prepared as it is necessary to approximate the amount of radioactivity in the substrate. In addition, it is necessary in many cases to match the particular radionuclide under study.
3. The intensity of marking actually attained on the film is dependent not only upon time of exposure and radionuclide energy, but also is affected by the plastic overlays commonly used and, in some special cases, temperature.
4. There is significant potential for "abuse" in that a convenient pen will potentially migrate from the laboratory.

The present invention relates to a process for the labeling of materials to be autoradiographed using a phosphorescent material, such as an ink effectively avoiding all of the radioactivity associated disadvantages cited above. In the Examples below, this is achieved by the use of a carefully selected phosphor with decay time adequate to allow convenient and effective application.

2. Prior Art

U.S. Pat. No. 2,396,219 discloses a phosphorescent marking crayon using a zinc-cadmium activated by copper phosphor.

U.S. Pat. No. 3,631,243 discloses a device for marking indicia on photographic film in a housing involving insertion into and withdrawal from the housing a unit bearing the indicia and a phosphorescent source of light to expose the film.

SUMMARY OF THE INVENTION

The present invention relates to a process of marking autoradiograms with the emissions from a phosphorescent material, preferably an ink, which contains a doped zinc sulfide phosphor, and optionally a visible pigment, a vehicle and a binder. The ink is marked onto the surface of a substrate to form indicia which then are used to provide activating radiation to form a latent photographic image in the photosensitive layer of an X-ray film which is developed along with the latent photographic image formed by exposure to the substrate.

DETAILED DESCRIPTION

The ink used in the present invention is based on phosphors which are of the hexagonal Wurtzite (C6mC) form of zinc sulfide doped with various trace metals. Suitable metal dopants include, but are not limited to silver, boron, barium, calcium, cadmium, copper, magnesium and silicon. Generally several but not all of the above metal dopants are present in the zinc sulfide phosphor. Generally the amount of individual metal dopants present will vary from 5–1000 ppm.

There are two major requirements for the phosphor to function adequately in the present invention. The radiation emission (light decay) must be long enough to allow appropriate manipulations to be performed in the darkroom prior to film placement. Secondly, and most important, there must be adequate emission of light at the appropriate wavelength to expose the film.

The major high speed autoradiography film in use today is primarily sensitive to blue light (e.g., Kodak XAR-5). We have found no blue emitting phosphor which has a sufficiently long radiation emission decay time to work satisfactorily in the present invention. However, surprisingly it has been found that some green emitting phosphors (peak radiation wavelength from 507–517) can be used satisfactorily with the commonly used blue sensitive X-ray film as well as with green sensitive X-ray film. This is particularly surprising as there is very little emission of the green phosphor under 450 nm while the sensitivity of these films is dramatically reduced at wavelengths over 450 nm.

The preferred green emitting phosphors are ones based on hexagonal Wurtzite zinc sulfide doped with 200–1000 ppm barium, 200–1000 ppm calcium, 50–250 ppm copper, 50–250 ppm magnesium and 20–100 ppm silicon; and another one based on hexagonal Wurtzite zinc sulfide doped with 5–25 ppm silver, 100–500 ppm cadmium, 50–250 ppm copper, 50–250 ppm magnesium and 50–250 ppm silicon. Generally the phosphor will have a particle size distribution peak between 10 and 15 microns.

The particular ink formulation is not particularly critical and both water-immiscible organic solvent based inks and aqueous acrylic inks have been used satisfactorily. Generally the ink should contain from 5–20 weight percent of the phosphor.

A wide variety of substrates are commonly evaluated for radioactivity detection and location in the research laboratory. Although application to slab gel electrophoresis detection is the most common, considerable work is done in the autoradiography and/or fluorography of tissue sections and thin layer chromatograms to name a few. In the autoradiography of electrophoresis materials, the gel itself may be evaluated (normally after drydown) or the radiolabeled materials in the gel transferred to an adsorptive membrane such as in the procedures described by Southern, E. M., *J. Molecular Biology*, 98, 503 (1975); Bittner et al., *Anal. Biochem.* 102, 459, (1980) and others. The manner in which the audioradiogram is prepared is not part of the present invention. Thus the materials subjected to autoradiography for use in the present invention are sheet-like members containing a distribution of radioactive material in a gel supported on a film of material such as nitrocellulose, microporous nylon (charged or uncharged) diazotized benzyloxymethyl cellulose (DBM), diazotized phenyl thioether cellulose, diethylaminoethyl cellulose, polyvinylidene fluoride or a tissue section appropriately fixed and mounted, etc. In certain cases, the matrix to be detected is impregnated with a fluor to convert the radiation emissions to light.

After marking the substrate with the phosphorescent ink to form indicia, the entire matrix bearing the phosphorescent ink is exposed to actinic light to charge up the phosphor contained therein. Ordinary light as found in a typical laboratory is satisfactory for this excitation and little is to be gained by using high intensity illumination of the substrate bearing the phosphorescent indicia. In fact, fairly low intensity light can be used and generally a very brief exposure (less than a minute) to actinic radiation is adequate to activate the phosphor. After exposure to actinic radiation, the long decay phosphor allows considerable time to ensue before the radiolabeled matrix must be superimposed on the X-ray film.

The device used to apply the phosphor containing ink to the substrate preferably is a capillary pen or a ballpoint pen although other means such as typewriter ribbons, hard graphite compositions, etc. can be used. The indicia marked on the autoradiogram serves several purposes including identification matching to the original substrate, orientation and registration.

EXAMPLES

A phosphorescent ink is prepared by blending 98 volume percent of a white ink containing 9.81 weight percent titanium dioxide pigment, 28.84 weight percent aluminum silicate clay, 19.22 weight percent chlorohydrocarbons consisting principally of 1,1,1-trichloroethane, 23.07 weight percent aromatic hydrocarbons, 3.2 weight percent wax resin, 14.42 weight percent mixed resins and 0.8 weight percent fumed silica, a volatility of 50% and a specific gravity of 1.4 with 2 volume percent of a green ink containing 10.9 weight percent lead chromate, 1.6 weight percent polychlorinated copper phthalocyanine, 4.1 weight percent wax resin, 16.22 weight percent mixed resins 28.9 weight percent aluminum silicate clay, 17.0 weight percent chlorohydrocarbons consisting principally of 1,1,1-trichloroethane, 20.6 weight percent aromatic hydrocarbons, a volatility of 50% and a specific gravity of 1.4.

EXAMPLE 1

The green ink prepared above is blended with the following phosphor in a ratio of 10 g phosphor per 100 g ink. The phosphor is a hexagonal Wurtzite (C6mC) form of zinc sulfide doped with about 450 ppm barium, about 450 ppm calcium, about 100 ppm copper, about 100 ppm magnesium and about 50 ppm silicon. A capillary type marking pen is filled with the resulting phosphorescent ink. A dried gel prepared from an electrophoretogram of radioactive proteins is marked on its gel surface with the pen both to identify the radiogram and to provide a plurality of location markers. The gel, in the light, is wrapped with a polyvinylidene chloride film and under a safe-light mounted in an X-ray film cassette using Kodak XAR-5 film where the X-ray film is exposed to the gel for 60 minutes. The X-ray film is then developed in the conventional manner. After development the marks made on the gel with the pen are clearly visible as dark lines on the X-ray film.

EXAMPLE 2

Example 1 is repeated except the phosphor used is a hexagonal Wurtzite (C6mC) form of zinc sulfide doped with about 10 ppm silver, 250 ppm cadmium, about 100 ppm copper, about 100 ppm magnesium and about 100 ppm silicon.

We claim:

1. A process comprising forming on a substrate containing therein a distribution of radioactively tagged material indicia of a nexagonal Wurtzite form of zinc sulfide doped with trace metals phosphor, exposing the indicia to actinic radiation to charge the phosphor, exposing an X-ray film to the thusly marked substrate and developing the X-ray film to provide an X-ray film containing indicia corresponding to the phosphor ink indicia made on the substrate.

2. The process of claim 1 wherein the radioactively tagged material is proteinaceous.

3. The process of claim 2 wherein tne indicia are formed with an ink containing 5–20 weight percent of the zinc sulfide phosphor.

4. The process of claim 3 wherein the phosphor emits radiation having a peak between about 507 to about 517 nm wavelength and the X-ray film is mainly sensitive to blue light of under 450 nm wavelength.

* * * * *